United States Patent
Russell et al.

(10) Patent No.: US 6,732,478 B1
(45) Date of Patent: May 11, 2004

(54) LIGHTING PANEL

(76) Inventors: Michael Gulvin Russell, 113 High Street, Bembridge, Isle of Wight PO35 5SF (GB); Michelle Evelyn Russell, 113 High Street, Bembridge, Isle of Wight PO35 5SF (GB)

( * ) Notice: Subject to any disclaimer, the term of this patent is extended or adjusted under 35 U.S.C. 154(b) by 0 days.

(21) Appl. No.: 09/856,563

(22) PCT Filed: Sep. 22, 2000

(86) PCT No.: PCT/GB00/03638
§ 371 (c)(1),
(2), (4) Date: Aug. 30, 2001

(87) PCT Pub. No.: WO01/21909
PCT Pub. Date: Mar. 29, 2001

(30) Foreign Application Priority Data

Sep. 22, 1999 (GB) ............................................... 9922263
May 12, 2000 (GB) ............................................... 0011362

(51) Int. Cl.⁷ .................................................. F21S 1/00
(52) U.S. Cl. ......................... 52/28; 52/126.1; 52/126.6; 52/786.11; 52/656.1; 52/657
(58) Field of Search .................. 362/153; 52/28, 52/126.1, 125.6, 480, 38, 126.6, 786.1, 786.11, 220.1, 656.1, 657; 108/23; 248/346.1, 678; 40/564, 600; 428/34, 16

(56) References Cited

U.S. PATENT DOCUMENTS

| | | | |
|---|---|---|---|
| 3,318,057 A | * 5/1967 | Norsworthy | 52/126.6 |
| 3,752,974 A | * 8/1973 | Baker et al. | 362/31 |
| 4,303,969 A | * 12/1981 | Hamilton et al. | 362/153 |
| 4,329,739 A | * 5/1982 | Loebner | 362/153 |
| 4,568,055 A | * 2/1986 | Klitzky | 248/477 |
| 4,654,762 A | * 3/1987 | Laverick | 362/97 |
| 4,952,023 A | * 8/1990 | Bradshaw et al. | 359/529 |
| 5,060,432 A | * 10/1991 | Christian | 52/233 |
| 5,271,973 A | * 12/1993 | Huether | 428/34 |
| 5,390,090 A | * 2/1995 | Nau | 362/153 |
| 5,407,711 A | * 4/1995 | Lovison et al. | 428/13 |
| 5,911,496 A | * 6/1999 | Hojnacki | 362/131 |
| 5,951,154 A | * 9/1999 | Carel et al. | 362/431 |
| 6,237,306 B1 | * 5/2001 | Dlubak | 52/786.11 |
| 6,250,001 B1 | * 6/2001 | Gillespie | 40/600 |

FOREIGN PATENT DOCUMENTS

| | | |
|---|---|---|
| DE | 90 00 867 U | 3/1991 |
| DE | 196 44 875 A | 4/1998 |
| EP | 0 308 828 A | 3/1989 |
| EP | 0 721 086 A | 7/1996 |

* cited by examiner

Primary Examiner—Carl D. Friedman
Assistant Examiner—Basil Katcheves
(74) Attorney, Agent, or Firm—Lahive & Cockfield, LLP

(57) ABSTRACT

A floor panel (20L) or (20R) comprises a first plastics sheet (5) edge lit by a light source in a space (8), a second plastics sheet (6) being provided above the first sheet and below an upper sheet (7) of glass. A floor may be formed by placing a number of panels together, and the floor panels may be mounted on a matrix of beams (22) which are themselves mounted on height adjustable pedestals.

17 Claims, 3 Drawing Sheets

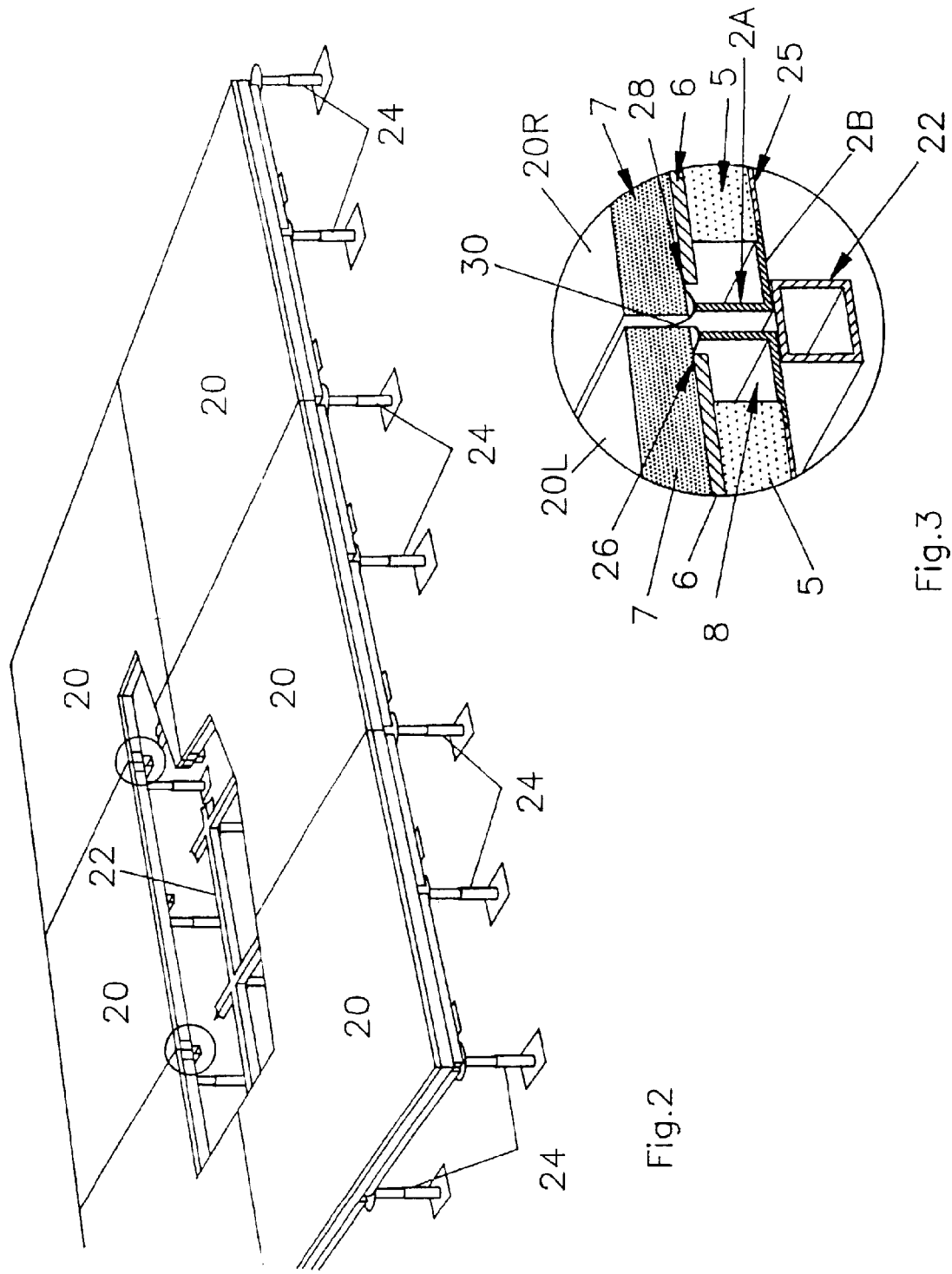

LIGHTING PANEL

The present invention relates to a lighting panel particularly for flooring.

Illuminated flooring panels are sometimes used e.g. at exhibitions, where it is desired to illuminate an object being displayed from underneath. Because such panels are also required to support the weight of people and in some cases heavy objects, such as a motor vehicle displayed at a motor vehicle exhibition, the panels have to be strong as well as transmit light. Known panels are provided by very thick (e.g. around 30 cm) panels of glass mounted on a floor frame, with lights under the glass. The thickness of the glass is required to give sufficient strength, but the weight of the glass makes these panels very heavy to transport and assemble. Also the lights underneath make the light intensity non-uniform over each panel.

The invention seeks to provide a lighting panel such as a flooring panel which avoids the above disadvantages.

According to the present invention there is provided a lighting panel comprising a sheet of plastic material and a sheet of glass mounted on and supported by said sheet of plastics material and overlapping it on at least one edge.

Preferably the sheet of plastics material is supported in a base member. Preferably the base member includes a support structure to support the sheet of plastics material. The base member may be a rectangular frame, and the support structure may be struts extending generally diagonally across corners of the frame and may also be parallel to the edges of the frame. The corners of the frame may include adjustable feet to level the frame relative to a floor on which it is sitting. Alternatively the support structure may be sheets of wood, such as plywood, in the base member.

In one embodiment the sheet of glass overlaps the sheet of plastics material on at least one edge, said light source/s being provided under the overlap between the edge of the sheet of plastics material and the frame. Preferably a second transparent or translucent sheet of plastic material is provided between the first sheet and said glass to give additional support to the glass under the overlap.

The sheet of plastics material may be an acrylic sheet. The acrylic sheet may have an ink dot coating on its surface to emit light from the light source edge lighting the sheet. The acrylic sheet may be of the type sold under the Trade Mark Prismex sold by ICI. A reflective layer maybe provided under the sheet of plastics.

The surface of the glass may be treated to provide a non-slip surface and/or to diffuse light. The surface of the glass maybe treated by shot blasting the surface.

The invention also extends to a floor produced by assembling two or more floor panels as defined above together.

An embodiment of the invention will now be described, by way of example, with reference to the accompanying drawings, in which:

FIG. 2 is a perspective view of a raised floor partly cut away made from a second embodiment of panels according to the present invention:

FIG. 3 is an enlarged view of part of FIG. 2; and

Figure 1:
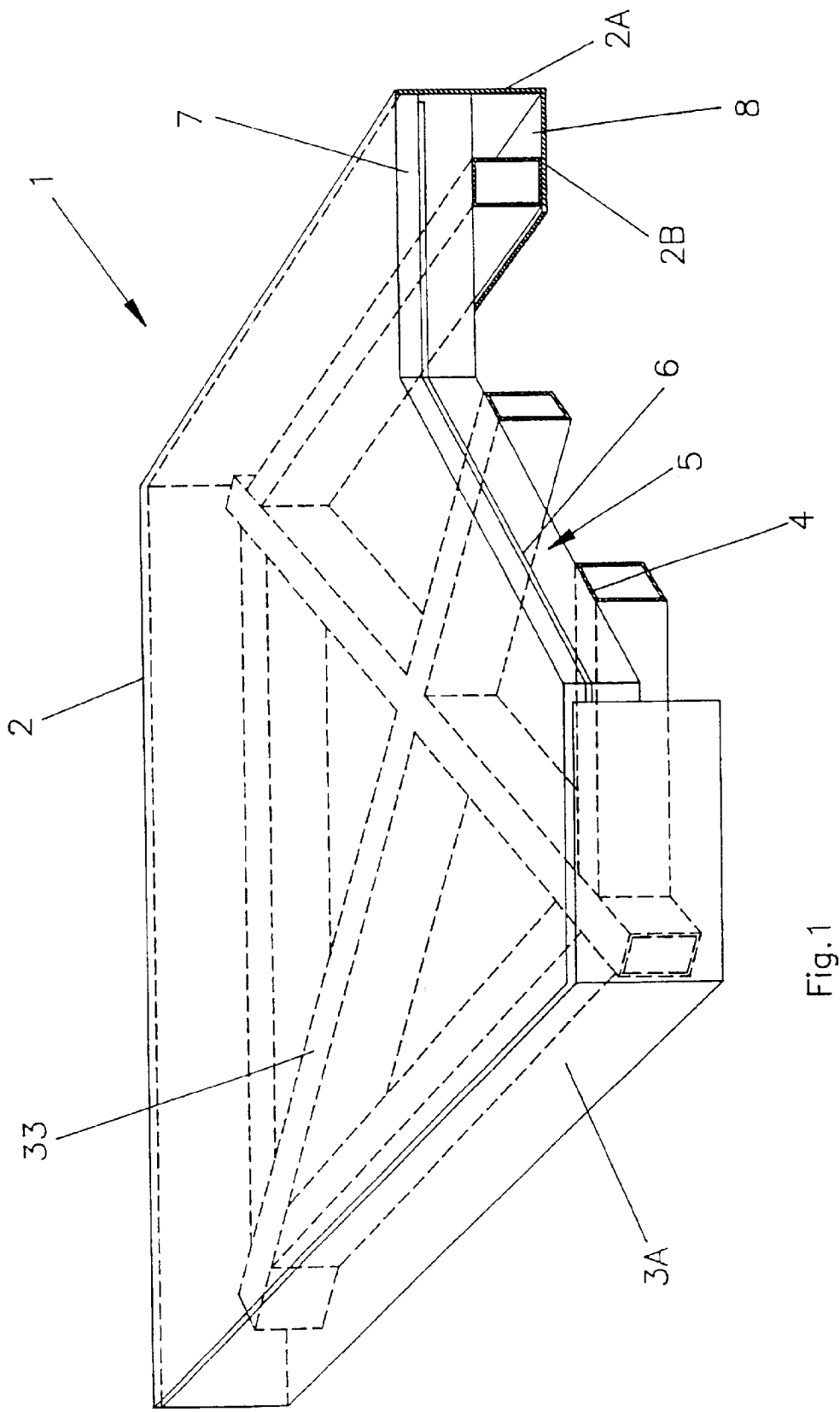
FIG. 1 is a perspective view partly in section of a first embodiment of a flooring panel according to the present invention.

Referring now to FIG. 1 of the drawings, there is shown a flooring panel 1. Panel 1 has a base member in the form of an outer rectangular frame 2 which is L-shaped in cross section providing a vertical edge 2A and a horizontal base 2B. Frame 2 is made of a light weight material, in this embodiment aluminium, and the aluminium is anodised to improve, inter alia, its aesthetic appearance.

Supported on the horizontal base 2B is a support structure in the form of rectangular struts 3A parallel to and spaced from the vertical edges 2A with additional struts 3B extending diagonally across the rectangular struts and generally diagonally across the corners of the frame 2. Struts 3A. 3B are also made of a light weight material such as aluminium.

Mounted on the support structure is a reflective layer 4, a sheet of plastics material in the form of a first sheet 5 of acrylic such as PRISMEX ("PRISMEX") is a Registered Trade Mark) on the upper surface of which is provided ink dots a second thinner plastics sheet 6 of transparent acrylic and a sheet of glass 7 on the second sheet 6.

Alone one edge of the frame (as shown in the cross-section on the right) the sheet 7 of glass and the second sheet 6 of acrylic overlaps the first acrylic sheet 5. A light source in the form of a fluorescent tube light 8 is provided under the overlap between the edge of the first acrylic sheet 5 and the frame vertical edge 3A. The light 8 provides horizontal edge lighting to the first acrylic sheet 5.

In use the light 8 emits light into the first acrylic sheet 5, which light emerges substantially uniformly through the upper surface through the ink dots, passes through the second acrylic sheet 6 and the glass sheet 7.

Because the glass sheet is supported by the first and second acrylic sheets 5 and 6, and the support structure, the glass sheet can be relatively thin, e.g. around 20 mm, and yet still support heavy weights. The second acrylic sheet provides support for the glass sheet in the region of the overlap above light 8, and it can be relatively thin.

The panel of FIG. 1 may have adjustable feet or pedestals (not shown) on the corners of the frame 2 to level the frame relative to a floor on which it is sitting.

It is envisaged that the panel of the invention is particularly useful for under lighting objects such as at an exhibition. The panel can be made in any desired size. Also two or more panels can be placed together to create a large illuminated floor area.

The invention thus extends to a floor produced by assembling two or more floor panels as described above together. In this respect the edges of the frame 2 may include connecting means so that two edges of separate frames can be joined together.

Referring now to FIG. 2, there is illustrated a raised floor made up of panels 20, according to a second embodiment of the invention, supported on a matrix of beams 22 supported by pedestals 24. The beams 22 are preferably made of steel or aluminium. As best seen in FIG. 3, the panels 20 are similar to those of FIG. 1, the same reference numerals being used to denote the same parts in the two Figs. The main differences are that the struts 3A and 3B have been omitted and that the horizontal base 2B of the frame 2 abuts the bottom of the first acrylic sheet 5. In addition, a reflector 25 consisting of an aluminium sheet is located beneath the acrylic sheet 5. Also the top sheet 7 extends over the top vertical edge 2A of the frame to secure in position there one of two types of gasket. The gasket 26 on the panel 20L is a simple compression gasket sealing the light chamber 8, while the gasket 28 in the panel 20R has in addition a sealing lip 30 which extends into the gap between the two panels. The panel 20L has the gaskets 26 on its four edges while the panel 20R has the gaskets 28 on its four edges, and the overall floor has alternate panels 20L and 20R.

The panels 20 rest on the matrix of beams 22 which are in turn mounted on platforms at the top of the pedestals 24, and it is preferred that interengaging means, such as pins and holes, be provided between the beams 22 and both the panels 20 and the pedestals 24. The pedestals 24 are height adjustable and the beams 22 incorporate spirit levels or other visible leveling means thus enabling the simple fabrication of the beams in a horizontal plane.

While as illustrated in FIG. 2 the beams are half the side length of the panels, they could be longer or shorter as desired, and similarly the number and spacing of the pedestals can be altered to give a flexible and easily adjustable support structure for the panels 20.

Because the panels of the invention use a relatively thin layer of glass (as any loading on the glass is distributed over the plastics sheet) as well as a light weight frame and support structure, the panels are relatively easy to transport and assemble compared to panels hitherto known where thick glass is required in order to obtain the desired strength. Also the edge lighting of the first acrylic layer gives a more uniform distribution of light.

Modifications maybe made to the embodiments described. The surface of the glass sheet 7, which may be a laminated sheet, may be treated to provide a non-slip surface and/or to diffuse light. For example, the surface of the glass may be treated by shot blasting. The glass sheet may be ordinary annealed glass.

Fixing points maybe provided to enable objects on the floor to be secured in position, and the panels as hereinbefore described may include aggregate such as glass in order to provide non-slip properties or maybe treated with an adhesive film or panel or epoxy coating. The support structure for the panels of FIG. 1 maybe sheets of wood, such as plywood instead of struts 3A, 3B. Also more than one light can be provided in a panel. e.g. along two opposing edges. Also the sheet of plastics material light source and sheet of glass need not be supported in a base member. For example a sheet of plastics material light source and sheet of glass could be positioned as a panel as a flooring, panel adjacent other illuminated or non-illuminated panels of a flooring system, e.g. an exhibition flooring system.

Instead of fluorescent lights other light sources such as light emitting diodes may be used, and indeed several light sources maybe provided to allow for colour changes or patterns. In more complex situations the light source may project an image.

The lighting panel of the invention maybe used for purposes other than flooring, e.g as a shelf in a display case to under light and support an object.

A reflector system may be provided around the light source to increase the overall light output and uniformity. This reflector system may consist of two parts, an upper and a lower section. The lower section is formed around the lamp while the upper section is supported by the lower. The upper section is formed so as to reflect light transmitted from the opposing light source through the glass top panel, so as to provide the effect of continuous illumination across the panel from edge to edge, thereby disguising the light source.

Figure 4:
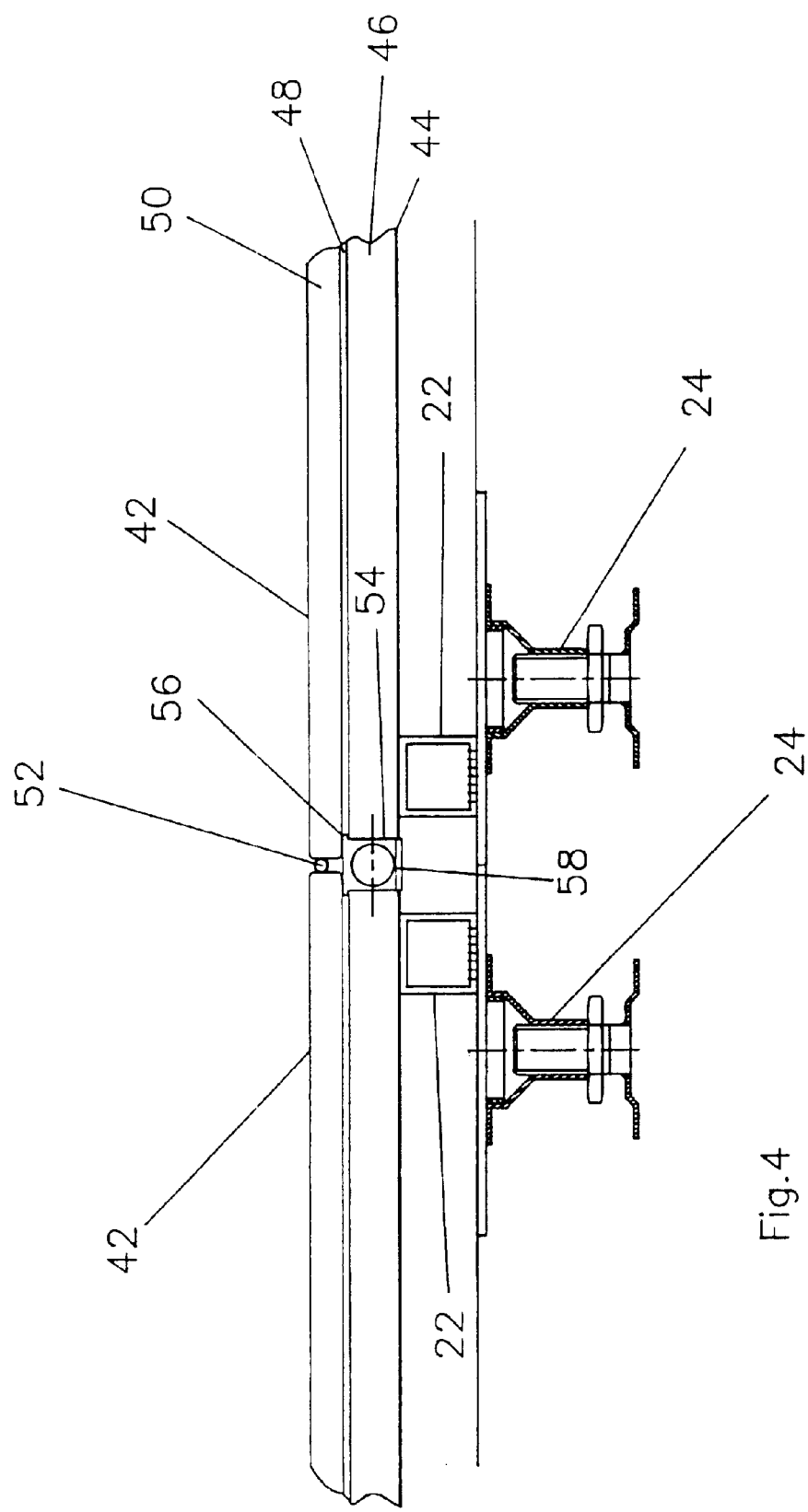
FIG. 4 is a side elevation of a raised floor made from a panels according to a third embodiment of the present invention.

FIG. 4 shows a floor supported on beams 22 which are in turn supported on pedestals 24, the floor being made up from panels 42. Each panel 42 consists of four layers which are, from bottom to top, a reflective layer 44, a light emitting acrylic sheet 46, a thinner plastics sheet 48 and a sheet of glass 50. The top sheet of glass 50 overhangs the other three sheets on at least two sides of the panel 42 so that when two panels 42 are placed side by side the abutting edges of the sheets 50, preferably with a sealing gasket between them, defines a space in which is located a lamp 54. In this way each lamp 54 illuminates both of the panels between which it is located and this illumination is enhanced by upper and lower reflectors 56 and 58 respectively located above and below the lamp 54.

The gasket 52 is preferably attached to one of the panels, that panel also having at least one other gasket attached to one of its other sides.

What is claimed is:

1. A lighting panel, comprising:
   a sheet of plastics material and a sheet of glass mounted on said sheet of plastics material and overlapping it on at least one edge;
   a second transparent or translucent sheet of plastic material provided between the first sheet and said glass to give additional support to the glass under the overlap; and
   a light source provided under the overlap at the edge of the sheet of plastics material.

2. A lighting panel as claimed in claim 1, in which the sheet of plastics material is supported in a base member.

3. A lighting panel as claimed in claim 2, in which the base member includes a support structure to support the sheet of plastics material.

4. A lighting panel as claimed in claim 3, in which the base member is a rectangular frame, and the support structure member comprises struts extending generally diagonally across corners of the frame.

5. A lighting panel as claimed in claim 4, in which the struts are also parallel to the edges of the frame.

6. A lighting panel as claimed in claim 4, in which the corners of the frame include adjustable feet to level the frame relative to a floor on which it is sitting.

7. A lighting panel as claimed in claim 4, in which the support structure is sheets of wood, such as plywood, in the base member.

8. A lighting panel as claimed in claim 1, in which the or each sheet of plastics material is an acrylic sheet.

9. A lighting panel as claimed in claim 1, comprising:
   a sheet of plastics material and a sheet of glass mounted on said sheet of plastics material and overlapping it on at least one edge; and
   a second transparent or translucent sheet of plastic material provided between the first sheet and said glass to give additional support to the glass under the overlap;
   in which the surface of the glass may be treated to provide a non-slip surface and/or to diffuse light.

10. A lighting panel as claimed in claim 9, in which the surface of the glass has been treated by shot blasting the surface.

11. A floor produced by assembling together two or more lighting panels as claimed in claim 1.

12. A floor as claimed in claim 11, in which the panels are supported on a matrix of beams.

13. A floor as claimed in claim 12, in which the beams include visible leveling means.

14. A floor as claimed in claim 13, in which the beams are supported on pedestals.

15. A floor as claimed in claim in which the pedestals height adjustable.

16. A lighting panel, comprising:
   a first sheet of plastics material and a sheet of glass mounted on said first sheet of plastics material and overlapping it on at least one edge;
   a second transparent or translucent sheet of plastic material provided between the first sheet and said glass to give additional support to the glass under the overlap; and a light source provided under the overlap at the edge of the sheet of plastics material;

in which the first sheet of plastics material has an ink dot coating on its surface to emit light from the light source edge lighting the sheet.

17. A lighting panel, comprising:

a first sheet of plastics material and a sheet of glass mounted on said first sheet of plastics material and overlapping said first sheet of plastics material on at least one edge;

a second transparent or translucent sheet of plastic material provided between the first sheet and said glass to give additional support to the glass under the overlap;

a reflective layer provided under the first sheet of plastics material; and a light source provided under the overlap at the edge of the first sheet of plastics material.

* * * * *